US010733963B2

(12) United States Patent
Yokota et al.

(10) Patent No.: US 10,733,963 B2
(45) Date of Patent: Aug. 4, 2020

(54) INFORMATION PROCESSING APPARATUS AND IMAGE PROCESSING METHOD (71) Applicant: SONY INTERACTIVE ENTERTAINMENT INC., Tokyo (JP)

(72) Inventors: Kenichiro Yokota, Tokyo (JP); Sachiyo Aoki, Tokyo (JP); Masaaki Hamada, Tokyo (JP); Yute Lin, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/335,389

(22) PCT Filed: Sep. 29, 2017

(86) PCT No.: PCT/JP2017/035646
§ 371 (c)(1),
(2) Date: Mar. 21, 2019

(87) PCT Pub. No.: WO2018/066482
PCT Pub. Date: Apr. 12, 2018

(65) Prior Publication Data
US 2019/0287494 A1 Sep. 19, 2019

(30) Foreign Application Priority Data
Oct. 6, 2016 (JP) ................. 2016-197850

(51) Int. Cl.
G09G 5/391 (2006.01)
H04N 5/57 (2006.01)
(Continued)

(52) U.S. Cl.
CPC ............. G09G 5/391 (2013.01); G06T 5/009 (2013.01); G09G 5/00 (2013.01); G09G 5/377 (2013.01); H04N 5/57 (2013.01)

(58) Field of Classification Search
CPC .......... H04N 7/0125; H04N 7/01; H04N 5/57; H04N 5/243; H04N 1/60; H04N 1/6027;
(Continued)

(56) References Cited

U.S. PATENT DOCUMENTS 10,192,294 B2    1/2019  Tsuru et al.
2016/0100183 A1* 4/2016  Yamamoto ............. H04N 19/44
                                                    386/230
(Continued)

FOREIGN PATENT DOCUMENTS

JP    2014-519221 A    8/2014
JP    2015-5878 A      1/2015
(Continued)

OTHER PUBLICATIONS

International Preliminary Report on Patentability dated Apr. 9, 2019, from International Application No. PCT/JP2017/035646, 15 sheets.

(Continued)

Primary Examiner — Dong Hui Liang
(74) Attorney, Agent, or Firm — Katten Muchin Rosenman LLP (57) ABSTRACT A luminance space conversion section of an information processing apparatus converts an image signal represented in a luminance space corresponding to an SDR into a signal represented in a luminance space corresponding to an HDR, and outputs the converted signal to a synthesis processing section that performs alpha blend processing on an HDR image. In an adjustment mode, a parameter adjustment section allows a display apparatus to display an adjustment image represented in the SDR and adjusts a parameter used for a conversion of the luminance space so that a change in a display image is made small before and after converting the luminance space. The parameter is stored in a conversion
(Continued)

parameter storage section after the adjustment and is used when a luminance signal conversion section performs conversion processing.

8 Claims, 8 Drawing Sheets

(51) Int. Cl.
*G09G 5/377* (2006.01)
*G06T 5/00* (2006.01)
*G09G 5/00* (2006.01)

(58) Field of Classification Search
CPC ... G09G 2320/0626; G09G 2320/0673; G09G 2320/062; G09G 2320/06; G09G 2360/16; G09G 5/026; G09G 5/02; G09G 2340/06; G09G 2340/12; G06T 2207/20208; G06T 5/007; G06T 7/97
See application file for complete search history.

(56) References Cited

U.S. PATENT DOCUMENTS

2016/0330513 A1* 11/2016 Toma ................... H04N 21/435
2017/0330529 A1* 11/2017 Van Mourik .......... H04N 19/85

FOREIGN PATENT DOCUMENTS

| JP | 2016-58848 A | 4/2016 |
|----|---|---|
| JP | 2016-195379 A | 11/2016 |
| WO | 2012/147010 A1 | 11/2012 |
| WO | 2016/027423 A1 | 2/2016 |
| WO | 2016/038950 A1 | 3/2016 |

OTHER PUBLICATIONS

International Search Report and Written Opinion dated Jan. 9, 2018, from International Application No. PCT/JP2017/035646, 10 sheets.

* cited by examiner

INFORMATION PROCESSING APPARATUS AND IMAGE PROCESSING METHOD

TECHNICAL FIELD

The present invention relates to an information processing apparatus that allows a display apparatus to display an image and an image processing method performed by the information processing apparatus.

BACKGROUND ART

In the past, various techniques have been developed for improving an image quality in a video display such as a television broadcasting or a distributed moving image. In recent years, in addition to a technique for improving resolution or color gamut, a technique for processing a signal of a high dynamic range (HDR) in which a luminance range is enlarged is being popularized. The HDR is approximately one hundred times as large as a conventional standard dynamic range (SDR) in an allowable range of the luminance. Therefore, a target that gives a dazzling feeling in a real world such as reflected light of sunlight can be represented more realistically even on an image. In not only the television broadcasting or distributed moving image but also a world of computer graphics such as a game image, a feeling of realism is more given to a virtual world through representation by using the HDR (e.g., see PTL 1).

CITATION LIST

Patent Literature

[PTL 1]
JP 2016-58848A

SUMMARY

Technical Problem

Even if using a display apparatus corresponding to an HDR luminance range, all images to be displayed are not always represented by the HDR. It is conceivable that an additional image provided on the side of a game machine or reproducing apparatus such as a help screen or control panel is represented in the SDR independently of an image of content. The content itself is represented in the SDR in many cases. The HDR and the SDR are different in a conversion rule and specifications between a luminance value and an electric signal indicating the luminance value. Further, a display apparatus manufacturer may control color development of displays by original processing. As a result, an image displayed through various conversion processing may have a color or brightness different from that of an original design depending on a combination of a content, an image processing apparatus, and a display apparatus.

The present invention has been made in view of the above circumstances. An object of the present invention is therefore to provide techniques capable of always displaying an image in a preferable state without depending on a luminance range assumed when creating images.

Solution to Problem

One mode of the present invention relates to an information processing apparatus. The information processing apparatus includes an image data acquisition section configured to acquire an image signal represented in a first luminance space, a luminance space conversion section configured to convert the image signal into a signal represented in a second luminance space, and an image output section configured to output the image signal represented in either luminance space to a display apparatus. The luminance space conversion section includes a parameter adjustment section that adjusts a parameter used for a signal conversion on the basis of predetermined information according to a display state in the display apparatus and converts a signal by using the parameter after the adjustment.

Here, the "luminance space" is a space for deciding a conversion rule at the time when a luminance value is indicated by a signal corresponding to a predetermined number of bits. Further, the "first luminance space" and the "second luminance space" are, for example, a luminance space corresponding to an SDR luminance range and a luminance space corresponding to an HDR luminance range, respectively. Note, however, that the first and second luminance spaces are not limited thereto; further, when a maximum range of the luminance capable of being indicated in each luminance space is different, a specific value of the range is not limited.

Another mode of the present invention relates to an image processing method. The image processing method by an information processing apparatus, includes a step of adjusting a parameter used to convert an image signal represented in a first luminance space into a signal represented in a second luminance space on the basis of predetermined information according to a display state in a display apparatus, a step of acquiring the signal of an image to be displayed, represented in the first luminance space, a step of converting the acquired signal of the image to be displayed into the signal represented in the second luminance space by using the parameter after the adjustment, and a step of outputting the converted signal of the image to be displayed to the display apparatus.

It is to be noted that arbitrary combinations of the above constituent elements as well as modes obtained by converting expressions of the present invention between a method, an apparatus, a system, a computer program, a recording medium in which the computer program is recorded, and the like are also effective as modes of the present invention.

Advantageous Effect of Invention

According to the present invention, an image can be always displayed in a preferable state without depending on a luminance range assumed at the time of creating an image.

DESCRIPTION OF EMBODIMENT

Figure 1:
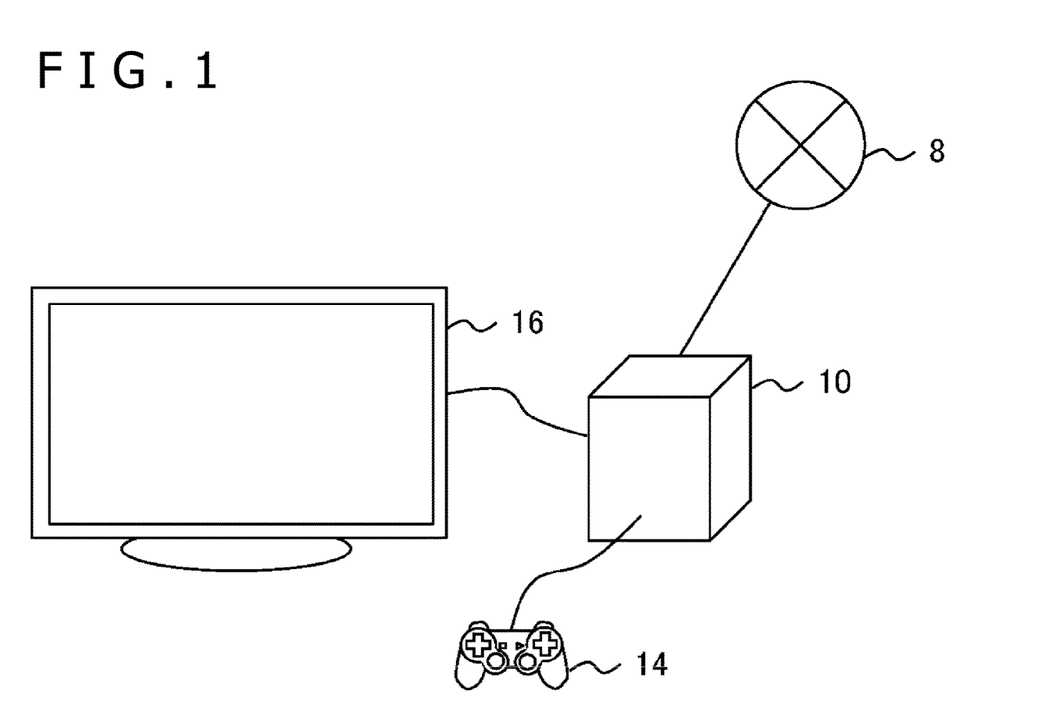
FIG. 1 is a diagram illustrating a configuration example of an information processing system according to the present embodiment.

FIG. 1 illustrates a configuration example of an information processing system according to the present embodiment. The information processing system includes an information processing apparatus 10, an input apparatus 14, and a display apparatus 16. As illustrated in the figure, the information processing apparatus 10 may be connected to a server or the like that provides various content via a network 8 such as the Internet. In addition to a general input apparatus in which a user operation is possible such as a controller, a keyboard, a mouse, a joy-stick, and a touch pad, the input apparatus 14 may be an image pickup apparatus that photographs a real world such as a user, a microphone that acquires voices, a sensor that detects various physical values, or a combination of any thereof.

The display apparatus 16 is implemented by using a liquid crystal display, plasma display, organic electroluminescence (EL) display, or the like that displays images. Further, the display apparatus 16 may include a speaker that outputs a voice. The input apparatus 14 and the display apparatus 16 may be connected to the information processing apparatus 10 by a wireline cable and further may be wirelessly connected thereto through a wireless local area network (LAN) or the like. Further, appearance shapes of the input apparatus 14, the display apparatus 16, and the information processing apparatus 10 are not limited to those illustrated in the figure; further, for example, two or more of them may be integrally formed.

The information processing apparatus 10 receives a signal according to the user operation from the input apparatus 14, performs processing according to the signal to generate data regarding a display image, and outputs the data to the display apparatus 16. The information processing apparatus 10 may be any of a game machine, a personal computer, a tablet terminal, a mobile terminal, a portable telephone, or the like. Contents of processing performed by the information processing apparatus 10 may be various in accordance with a mode of the information processing apparatus 10, application selected by the user, or the like.

For example, the information processing apparatus 10 progresses an electronic game specified by the user in accordance with the user operation, generates data of a game screen at a predetermined frame rate, and outputs the data. Alternatively, data of a moving image may be acquired from the server via the network 8 and may be decoded and output sequentially. As described above, usage purposes of the information processing apparatus 10 may be various and contents of information processing performed in accordance with the usage purposes are also different, and therefore detailed descriptions are omitted. Hereinafter, a method for preferably displaying an image of content generated as a result of the above information processing, an image in which information to be proposed is represented, or the like will be described mainly.

Figure 2:
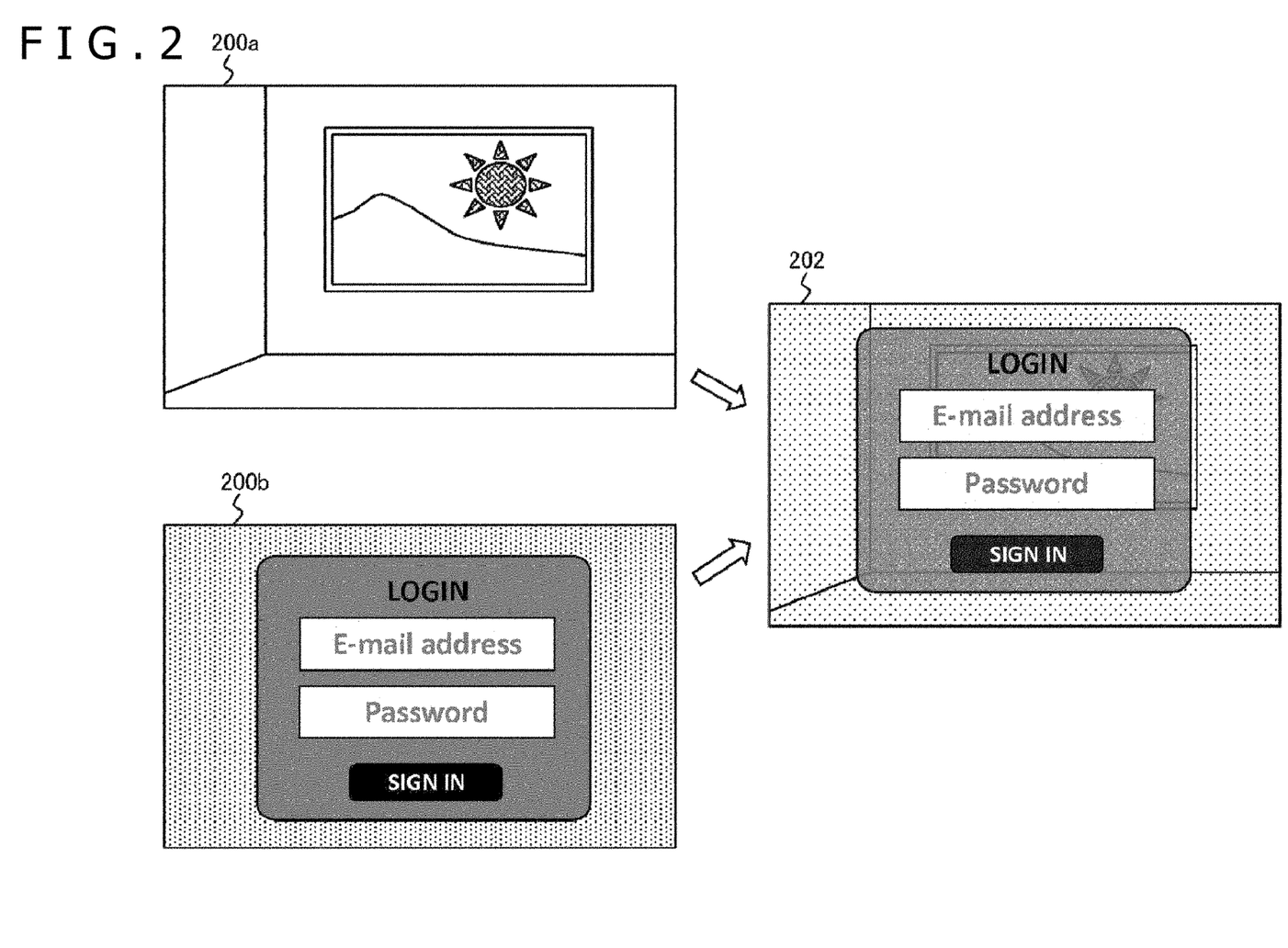
FIG. 2 is a diagram schematically illustrating an example of an image generated by an information processing apparatus according to the present embodiment.

FIG. 2 schematically illustrates an example of an image generated by the information processing apparatus 10 according to the present embodiment. In this example, a main image 200a is an image displayed mainly such as a game or a moving image. An additional image 200b is an image displayed spontaneously if necessary and an example illustrated in the figure includes a dialog box for allowing the user to input an address and password for a login. When the above dialog box needs to be displayed, the information processing apparatus 10 superimposes the additional image 200b including the dialog box on the main image 200a displayed originally and generates and outputs a display image 202.

In an area as wide as possible at this time, the main image 200a becomes see-through via the additional image 200b. Thereby, a world-view of the main image 200a such as a game or a moving image is allowed to be preferably merged with necessary information without interruption. Further, when transparency of the additional image 200b is temporally changed, even a performance in which the dialog box appears or disappears eventually can be performed.

It is understood by those skilled in the art that a case of allowing a plurality of images to be superimposed and displayed is considered variously other than the example illustrated in the figure. In the case of a racing game, for example, it is conceivable that the additional image in which the entire course is surveyed is additionally displayed on the main image that indicates a field of view of a driver. In the case of displaying a movie picture, it is conceivable that an image indicating bibliographic information regarding a clue, a performer, or the like, or an operation panel such as reproduction, temporary stop, and fast forward is additionally displayed.

In the case where the above display image 202 is generated, luminance $F_{out}$ of each pixel of the display image 202 can be decided by using alpha blend processing represented by the following formula.

$$F_{out} = (1-\alpha)Fb_1 + \alpha Fb_2 \quad \text{(Formula 1)}$$

Here, $Fb_1$ and $Fb_1$ represent luminance of pixels corresponding to the main image 200a and the additional image 200b respectively, and $\alpha$ is a general $\alpha$ value that is set to the pixel of the additional image 200b, namely, a value equal to or greater than 0 and equal to or smaller than 1.0 indicating transmittance.

For example, when the $\alpha$ value is changed from 0 to 1.0 in the entire image, from a state in which only the main image 200a is displayed, a color of the additional image 200b becomes deep eventually. Finally, the additional image 200b is opaquely displayed. When the $\alpha$ value is an intermediate value that is greater than 0 and smaller than 1.0, the additional image 200b is in a translucent state at deepness according to the value and the main image 200a becomes see-through.

Note that when the main image 200a and the additional image 200b are an RGB image, luminances $Fb_1$ and $Fb_2$ is set to the luminances $Fb_1$ and $Fb_2$ of three channels, individually. Further, according to the present embodiment, they are generically referred to as the luminances $Fb_1$ and $Fb_2$. Further, the luminances $Fb_1$ and $Fb_2$ and the $\alpha$ value individually are set to each pixel, and therefore they strictly depend on a two-dimensional position coordinate (x, y) in an image plane. By contrast, formula 1 assumes a calculation according to the pixel of the same position and therefore does not represent the position coordinate. The following descriptions are also similar.

Formula 1 is a calculation formula in which the a value of the main image 200*a* is not considered. Further, a background image is set, or the like, and transmittance is set even to the main image 200*a*. In such a case, the luminance $F_{out}$ of each pixel of the display image 202 can be calculated by the following formula.

$$\alpha_{out} = (1-\alpha_2)\alpha_1 + \alpha_2$$

$$F_{out} = (\alpha_1(1-\alpha_2)Fb_1 + \alpha_2 Fb_2)/\alpha_{out} \quad \text{(Formula 2)}$$

Here, $\alpha_1$ and $\alpha_2$ are the $\alpha$ values that are set to each pixel of the main image 200*a* and the additional image 200*b*, respectively. Note that, when the main image 200*a* is opaque, namely, when $\alpha_1 = 1$ holds, formula 2 is represented by formula 1.

In such a configuration, a case is considered in which the main image 200*a* differs from the additional image 200*b* in a space in which the luminance is defined. For example, a case in which in a processing apparatus of content, the additional image 200*b* is steadily generated in an SDR whereas the content to be processed is represented in an HDR corresponds to the above case. Even if luminance signals are a luminance signal corresponding to the same 10 bits, the SDR differs from the HDR in the luminance value indicated by the luminance signal. Therefore, signals represented in different luminance spaces cannot be directly substituted in formula 1 or formula 2, and the luminance space needs to be unified in any stage before the substitution. The above fact is not limited to the SDR/HDR; further, when the luminance space of an image as a target of the alpha blend processing is different, it is similar.

The main image 200*a* and the additional image 200*b* are represented in the HDR and the SDR, respectively, and the display apparatus corresponds to an HDR luminance range. In such a case, when the luminance of the additional image 200*b* is indicated in an HDR space, a real world-view represented by the main image 200*a* can be held. In the present embodiment, even if the luminance space of the image needs to be converted as described above, the present embodiment aims at suppressing an influence on a color, brightness, or the like in the display and always performing a preferable display.

Hereinafter, a case in which the luminance space of the additional image is converted from an SDR luminance space to an HDR luminance space will be mainly described; however, an applicable scope of the present embodiment is not limited thereto. Specifically, the present embodiment can be similarly applied to a situation in which the luminance space of the image to be processed needs to be converted due to a performance of the display apparatus or synthetic processing, and that ought to be performed so that a physical appearance is not changed by conversion processing. For example, even if an image is defined in the HDR luminance space, the present embodiment can be applied to a case in which an image in which a range of actual luminance fits into an SDR range needs to be redefined in the SDR luminance space, or the like.

Figure 3:
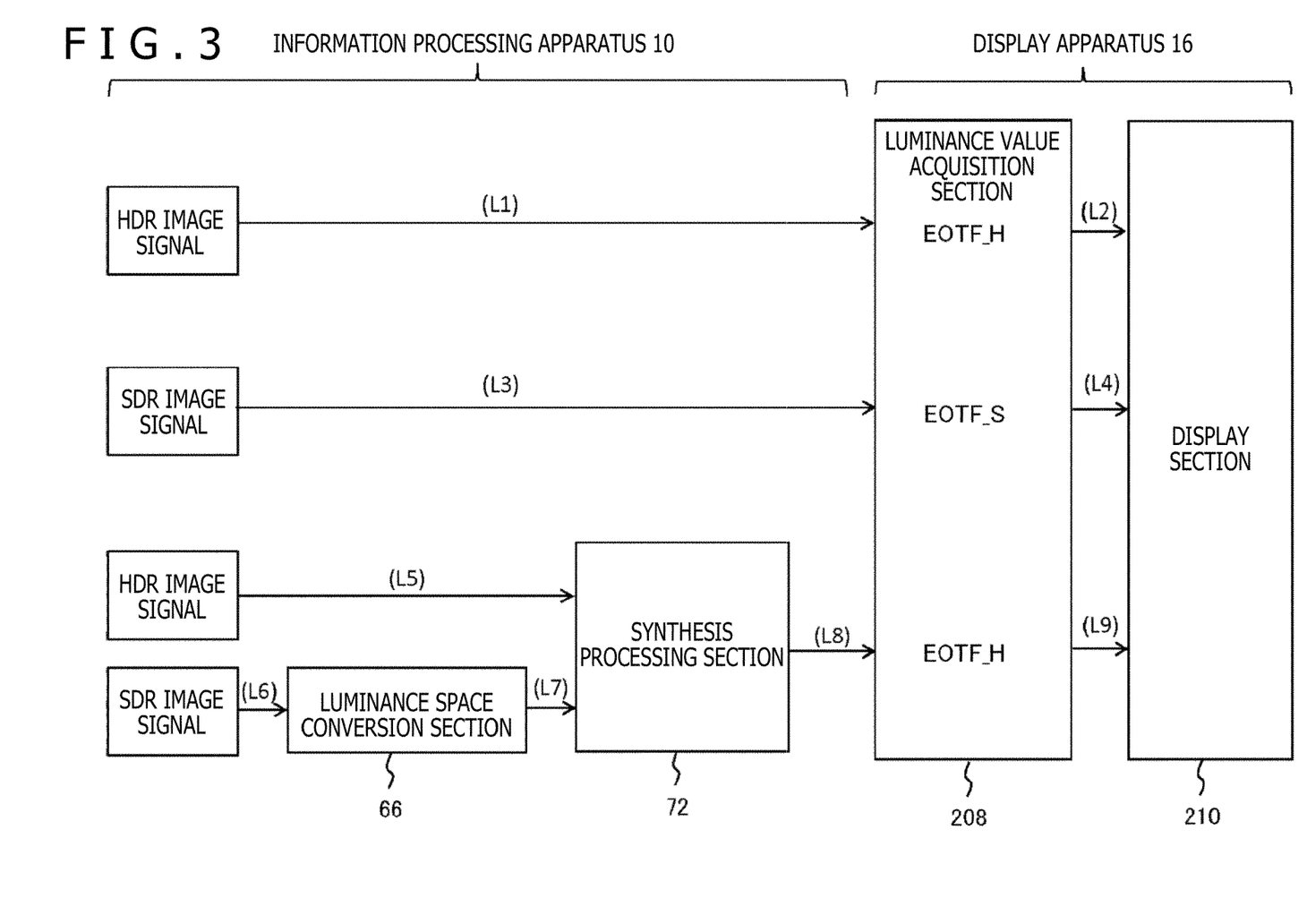
FIG. 3 is a diagram illustrating an outline of a signal of an image output from the information processing apparatus and signal processing in a display apparatus according to the present embodiment.

FIG. 3 illustrates an outline of an image signal output from the information processing apparatus 10 and that of the signal processing of the display apparatus 16. First, in the case where an HDR image or an SDR image is displayed independently, the information processing apparatus 10 outputs the luminance signal of an image that is generated or decoded internally to the display apparatus 16 (L1 or L3). The signal is obtained by converting an original luminance value into an electric signal corresponding to a predetermined number of bits such as 10 bits. For the conversion, an optical-electro transfer function (OETF) corresponding to each of the HDR and the SDR is used.

The display apparatus 16 is notified of whether a space in which the luminance signal output as described above is defined is the HDR space or the SDR space from the information processing apparatus 10 by setting the output luminance signal to the additional information of the signal or transmitting a mode switching request signal in advance. In the display apparatus 16 that receives the luminance signal of the image, a luminance value acquisition section 208 converts the luminance signal into the luminance value by using an electro-optical transfer function (EOTF). The EOTF is different depending on whether the received image signal is an HDR image signal or an SDR image signal. In the figure, the EOTF in which the received image signal is the HDR image signal is represented by an EOTF_H and the EOTF in which the received image signal is the SDR image signal is represented by an EOTF_S.

Through the process, even if the image signal is a signal corresponding to the same 10 bits in the EOTF_H and the EOTF_S, luminance values of different ranges such as 0 to 100 nits in the SDR image and 0 to 10000 nits in the HDR image are obtained in each pixel. The luminance value is output to a display section 210 having a display panel in the order corresponding to pixels (L2 or L4), and thereby the image is displayed in each luminance range. Note that, in the case where maximum luminance to which the display apparatus 16 corresponds is the intermediate value such as 1000 nits, when the maximum luminance of the HDR image is greater than the intermediate value, the luminance value acquisition section 208 further adjusts the luminance range so as to fit in the maximum luminance of the display apparatus 16.

In such an environment, the SDR image (e.g., the additional image 200*b* illustrated in FIG. 2) is superimposed and displayed on the HDR image (e.g., the main image 200*a* illustrated in FIG. 2) by the alpha blend processing. In this case, the luminance signal of the SDR image is first input to a luminance space conversion section 66 of the information processing apparatus 10 (L6). The luminance space conversion section 66 converts the signal into the luminance signal in the HDR space. Details of the conversion processing may be various depending on a specification to be adopted. Basically, the SDR luminance space is compressed and associated with a portion of the HDR luminance space. Thereby, the luminance signal before the conversion is set to fit in a portion of the range in the HDR space after the conversion.

Figure 4:
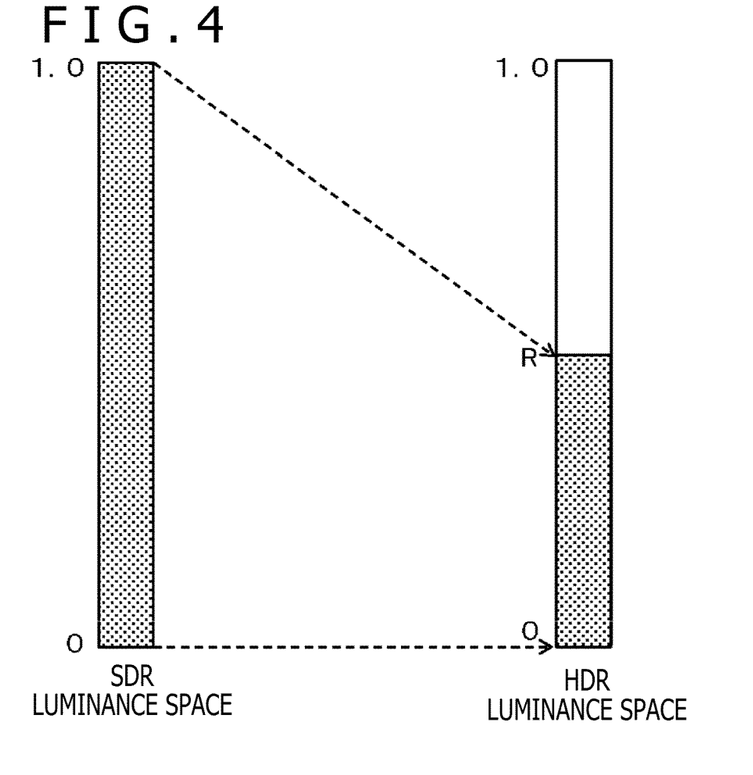
FIG. 4 is a diagram schematically illustrating an appearance of conversion processing in a luminance space according to the present embodiment.

FIG. 4 schematically illustrates an appearance of the conversion processing in the luminance space. In the figure, a left rectangle represents the SDR luminance space and a right rectangle represents the HDR luminance space. In an example illustrated in the figure, the entire luminance space is indicated in a range of 0 to 1.0. Actually, the above example is data corresponding to the predetermined number of bits such as 10 bits. Further, regarding actual luminance indicated in each luminance space, for example, an SDR luminance is from 0 to 100 nits and the HDR luminance is from 0 to 10000 nits.

As illustrated by hatching in the figure, a rate R is set so that the entire SDR luminance space (0 to 1.0) fits in a portion of range of 0 to R (only 0<R<1.0) in the HDR luminance space and a conversion rule is set under the conditions. The actual conversion rule may be obtained by using a linear conversion of multiplying the luminance signal in an SDR space by the rate R without exception or by using a nonlinear monotonically increasing function. A lookup table in which the conversion rule is represented as a table may be prepared. In addition, the luminance signal converted as described above may be further converted if necessary.

Returning to FIG. 3, using, as an input value, the luminance signal (L7) of the image converted into the HDR space by the luminance space conversion section 66 as described above and the luminance signal (L5) of the image originally represented in the HDR, the synthesis processing section 72 performs the alpha blend processing by using formula 1 or formula 2. Here, $Fb_1$ and $Fb_2$ of formula 1 or formula 2 correspond to an input of L5 and L7, respectively. Note that, it is assumed that the $\alpha$ value used for an alpha blending calculation is originally retained by the synthesis processing section 72 or input separately.

The information processing apparatus 10 outputs, as the HDR image, the luminance signal representing an image (e.g., the display image 202 illustrated in FIG. 2) generated as a result of the alpha blend processing to the display apparatus 16 (L8). The luminance value acquisition section 208 of the display apparatus 16 that receives the signal acquires the luminance value by the EOTF corresponding to the HDR and outputs the luminance value to the display section 210 (L9). The process permits necessary information to be preferably displayed without impairing the world-view of content originally represented in the HDR and changing a generation mechanism of the additional image in which the SDR image is assumed.

In the case where processing of converting the luminance space within the information processing apparatus 10 is needed as described above, it is conceivable that the conversion processing exerts an influence on a display result of the display apparatus 16. Specifically, even if original images are the same SDR image, a color or brightness may be changed in a signal input from L3 and a signal input from L8 even if a change in the transparency is eliminated. The reason is that final acquisition processing of the luminance in the luminance value acquisition section 208 differs depending on the display apparatus manufacturer or the like and reversibility of the luminance signal through the conversion processing in the luminance space is not secured.

As a result, a color or brightness of the display image is changed depending on the presence or absence of the conversion processing in the luminance space or the connected display apparatus. Further, in some cases, it is conceivable that difficulty in viewing an object or uncomfortable feeling is given to the user. In the case where a plurality of images are superimposed and displayed, particularly, it is difficult to adjust how to view only one image on the side of the display apparatus. To solve the above problem, in the present embodiment, the user or the information processing apparatus 10 aims at adjusting a parameter used for the conversion of the luminance space. Through the process, an originally intended image is stabilized and displayed regardless of the presence or absence of the conversion processing in the luminance space or the display apparatus.

In the case where the user makes adjustment, a user interface is provided such that the display apparatus 16 is allowed to actually display the same image represented in each luminance space and a parameter can be adjusted while comparing the images. In the case where the information processing apparatus 10 makes adjustment, the parameter is adjusted so that a difference between the luminance values actually output in the display apparatus 16 is acquired and the difference is made small when the display apparatus 16 is allowed to display the same image represented in each luminance space.

Figure 5:
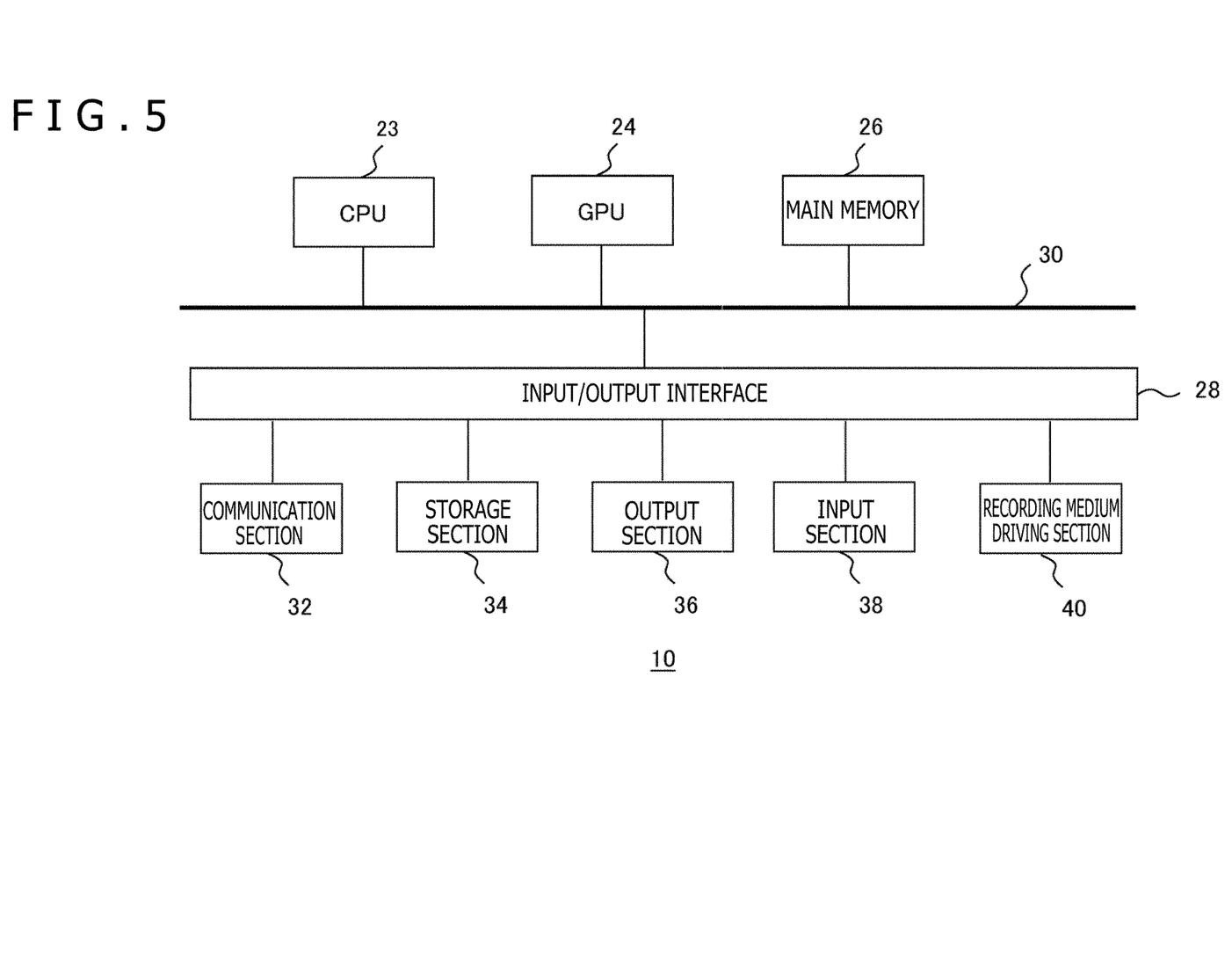
FIG. 5 is a diagram illustrating an internal circuit configuration of the information processing apparatus according to the present embodiment.

FIG. 5 illustrates an internal circuit configuration of the information processing apparatus 10. The information processing apparatus 10 includes a central processing unit (CPU) 23, a graphics processing unit (GPU) 24, and a main memory 26. These sections are connected to each other via a bus 30. An input/output interface 28 is further connected to the bus 30. To the input/output interface 28 are connected a peripheral equipment interface such as universal serial bus (USE) or Institute of Electrical and Electronics Engineers (IEEE) 1394, a communication section 32 including a network interface of a wired or wireless LAN to be connected to the network 8 or the like, a storage section 34 such as a hard disk drive or a nonvolatile memory, an output section 36 that outputs data to the display apparatus 16, an input section 38 through which data is input from the input apparatus 14, and a recording medium driving section 40 that drives a removable recording medium such as a magnetic disc, an optical disc, or a semiconductor memory.

The CPU 23 controls the entire information processing apparatus 10 by executing an operating system stored in the storage section 34. The CPU 23 also executes various programs that are read from the removable recording medium and loaded into the main memory 26 or downloaded via the communication section 32. Also, the communication section 32 may establish communication with an external apparatus such as the server via the network 8, acquire data of electronic content such as the moving image, and transmit data generated within the information processing apparatus 10.

The GPU 24 has a Geometry engine function and a rendering processor function and performs drawing processing in accordance with a draw command from the CPU 23 and stores data of the display image in a frame buffer (not illustrated). Then, the GPU 24 converts the display image stored in the frame buffer into a video signal and outputs the video signal from the output section 36 to thereby allow the display apparatus 16 to display images. The main memory 26 is configured from a random access memory (RAM) and stores a program or data necessary for processing.

Figure 6:
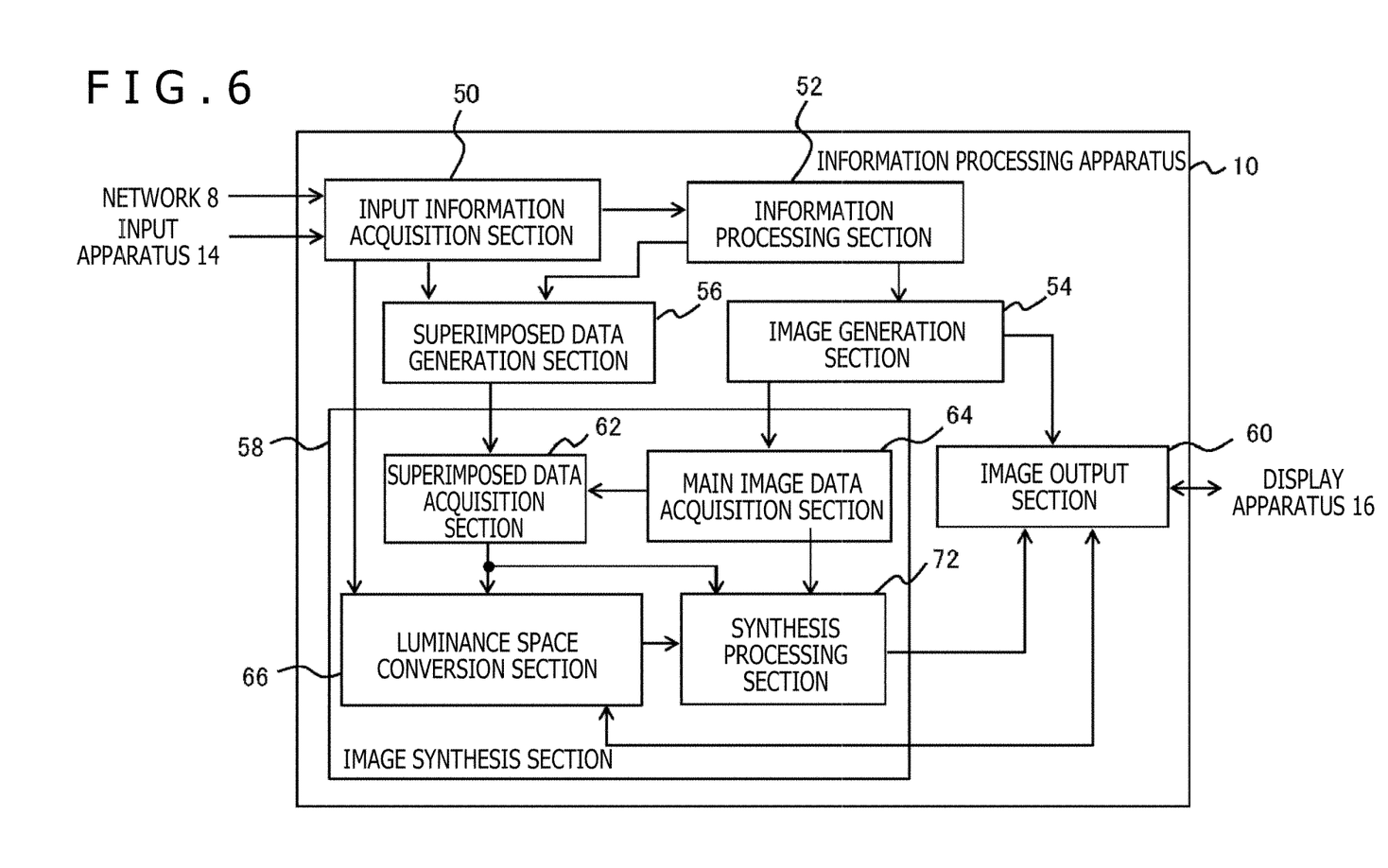
FIG. 6 is a diagram illustrating a configuration of functional blocks of the information processing apparatus according to the present embodiment.

FIG. 6 illustrates a configuration of functional blocks of the information processing apparatus 10. Further, each of the functional blocks illustrated in FIG. 6 and FIG. 7 hereinafter described can be implemented, in hardware, from components such as the CPU, the GPU, the various memories, and the data bus illustrated in FIG. 5 and can be implemented, in software, by a program loaded from a recording medium or the like into a memory and exhibiting various functions such as a data inputting function, a data retaining function, an arithmetic function, an image processing function, and a communication function. Accordingly, it can be understood by those skilled in the art that the functional blocks described above can be implemented in various forms only from hardware, only from software or from a combination of hardware and software but without limited to any of them.

The information processing apparatus 10 includes an input information acquisition section 50 that acquires input information from the input apparatus 14, an information processing section 52 that performs information processing according to the user operation of a game or the like, an image generation section 54 that generates data of the main image, a superimposed data generation section 56 that generates the additional image and data of the ∝ value, an image synthesis section 58 that synthesizes the main image and the additional image, and an image output section 60 that outputs the data of the display image to the display apparatus 16.

The input information acquisition section 50 is implemented by using the input section 38, the CPU 23, and the like and acquires data indicating contents of the user operation from the input apparatus 14. Here, the user operation may be performed in a general information processing apparatus such as a selection of applications to be performed or content to be output, a start/end of processing, or command input. As one of such an operation, a display requirement of various pieces of information represented as the additional image is included. Further, the input information acquisition section 50 acquires even contents of the user operation according to the adjustment in a mode of adjusting a parameter used for the conversion of the above-described luminance space.

In the case where an image pickup apparatus or various sensors are introduced as the input apparatus 14, the input information acquisition section 50 may acquire data such as a photographed image or an output value of the sensor. Further, the input information acquisition section 50 may acquire data of electronic content such as a moving image from the server via the network 8. The input information acquisition section 50 arbitrarily provides the acquired data for the information processing section 52, the superimposed data generation section 56, and the image synthesis section 58 in accordance with contents of the data.

The information processing section 52 is implemented by using the CPU 23, the main memory 26, and the like and performs information processing such as a game on the basis of the data provided from the input information acquisition section 50. When processing performed by the information processing section 52 as described above is performed along with an image display, contents thereof are not particularly limited. The image generation section 54 is implemented by using the GPU 24, the main memory 26, and the like and generates the data of the main image in accordance with a requirement from the information processing section 52. For example, in the case where the information processing section 52 performs a game, the image generation section 54 draws a game image at the predetermined frame rate in accordance with the user operation, an output value of the sensor, or the like.

Alternatively, the image generation section 54 may decode or decompress data of the moving image specified by the information processing section 52. The data of the moving image may be data retained within the information processing apparatus 10, data stream-transferred from the server via the network 8, or data photographed on the spot by the image pickup apparatus. In either case, data finally generated by the image generation section 54 is the luminance signal represented in either space of the HDR space and the SDR space. During a period at which the additional image need not be superimposed, the image generation section 54 outputs data of the generated main image to the image output section 60.

During a period at which the additional image needs to be superimposed, the image generation section 54 outputs the data of the generated main image to the image synthesis section 58. The superimposed data generation section 56 is implemented by the CPU 23, the GPU 24, the main memory 26, and the like and generates data of the additional image if necessary. The additional image may be called out by the user to thereby be displayed as needed or may be displayed at timing decided by the information processing section 52 in accordance with progress of a game or moving image. Alternatively, the additional image may be always displayed in a corner of a screen or the like. Image data retained internally may be used to generate the image, or data acquired by the input information acquisition section 50 from an external apparatus such as the image pickup apparatus or server may be used.

According to the above-described example, the data finally generated by the superimposed data generation section 56 is a luminance signal represented in the SDR space. Further, the superimposed data generation section 56 decides the ∝ value that decides that the additional image is displayed at any transmittance, for each pixel in association with the additional image. The ∝ value is allowed to temporally change and thereby the additional image may appear or disappear eventually. The superimposed data generation section 56 outputs data of the generated additional image and data of the ∝ image in which the ∝ value is defined as a pixel value to the image synthesis section 58. Note that, in the case where the ∝ value is set also to the main image, the image generation section 54 outputs even the data of the ∝ image to be set to the image to the image synthesis section 58.

The image synthesis section 58 is implemented by the CPU 23, the GPU 24, the main memory 26, and the like. Note that, the image synthesis section 58 may be implemented as an image synthesis apparatus in which two pieces of image data are superimposed and that outputs the display image. In particular, the image synthesis section 58 includes a superimposed data acquisition section 62 that acquires data for superimposition, a main image data acquisition section 64 that acquires the data of the main image, the luminance space conversion section 66 that coverts the luminance space, and a synthesis processing section 72 that generates the data of the display image by the alpha blend processing.

The superimposed data acquisition section 62 acquires a luminance signal of the additional image and the data of the ∝ image in which the ∝ value is defined as a pixel value from the superimposed data generation section 56. The main image data acquisition section 64 acquires a luminance signal of the main image from the image generation section 54 and provides the luminance signal for the synthesis processing section 72. Further, the main image data acquisition section 64 determines the presence or absence of the need to convert the luminance space of the additional image on the basis of the luminance space of the main image specified through a data analysis, etc.

Specifically, in the case where the additional image is steadily represented in the SDR whereas the main image is represented in the HDR, the main image data acquisition section 64 determines that it is necessary to convert the luminance space of the additional image. Note, however, that the present embodiment is not limited thereto as the gist. When a space in which the luminance is defined is different, it is determined that the conversion is necessary regardless of a difference between the SDR and the HDR. In the case where the additional image is generated by an algorithm slightly fixed in the information processing apparatus whereas the main image is prepared at a high freedom degree on the side of the content provision, such a situation may occur frequently.

In the case where the conversion of the luminance space is necessary, the main image data acquisition section 64 notifies the superimposed data acquisition section 62 of that effect. Alternatively, the superimposed data acquisition section 62 notified of the luminance space of the main image by the main image data acquisition section 64 may determine the need for the conversion by considering both the main image and the additional image. The superimposed data acquisition section 62 switches a provision destination of the acquired data in accordance with the presence or absence of the need for the conversion of the luminance space. Specifically, in the case where the luminance space does not need to be converted, the superimposed data acquisition section 62 directly provides the acquired data for the synthesis processing section 72. In the case where the luminance space needs to be converted, the superimposed data acquisition section 62 provides the acquired data for the luminance space conversion section 66.

In the case where data is directly acquired from the superimposed data acquisition section 62, the synthesis processing section 72 substitutes the data and the data of the main image acquired from the main image data acquisition section 64 in the above-described formula 1 or formula 2 and calculates a pixel value of the display image. In an example to be assumed, the above situation is brought about at the time of a luminance signal in which both the main image and the additional image are defined in the SDR space. Therefore, the pixel value to be calculated is also changed to a luminance signal of the SDR space. Note that, as a modification example, even in the case where both the main image and the additional image are originally defined in the HDR space, it goes without saying that the pixel value of the display image can be directly calculated. In this case, the pixel value to be calculated is changed to the luminance signal in the HDR space.

The luminance space conversion section 66 has the same function as that of the luminance space conversion section 66 illustrated in FIG. 3 and converts the luminance space of the additional image provided from the superimposed data acquisition section 62. In an example to be assumed, as described above, the luminance signal defined in the SDR space is converted into the HDR luminance signal. The luminance space conversion section 66 further provides an interface for accepting the adjustment of a parameter used for the conversion from the user. Specifically, the luminance space conversion section 66 prepares an adjustment image defined in the SDR luminance space and retains the image in an internal memory. In the case where the image is directly output as the SDR luminance signal and in the case where the image is converted into the HDR luminance signal to be output, the luminance space conversion section 66 aims at comparing images displayed on the display apparatus 16.

Then, the luminance space conversion section 66 accepts an adjustment operation of the parameter used for the conversion from the user and reflects an adjustment result on the display in real time. The user directly outputs the SDR luminance signal, converts the SDR luminance signal into the displayed image and the HDR luminance signal for output, and performs the adjustment operation until the displayed image is approximately changed to a similar physical appearance. When an appropriate parameter is fixed as described above, the additional image can be superimposed and displayed at a similar color or brightness in subsequent processing without depending on processing inside the display apparatus 16 and regardless of whether the main image is the SDR image or the HDR image.

In place of allowing the user to make adjustment, the luminance space conversion section 66 itself may adjust the parameter. In this case, in the case where the adjustment image is directly output as the SDR luminance signal and in the case where the adjustment image is converted into the HDR luminance signal to be output, the luminance space conversion section 66 compares luminance at the time when the display apparatus 16 allows the display panel to actually emit light. Specifically, the luminance space conversion section 66 allows a luminance value output from the luminance value acquisition section 208 illustrated in FIG. 3 to be fed back to the information processing apparatus 10 and adjusts the parameter so that a difference between the luminance values in each luminance space is made small. Here, the luminance value may be compared by using a predetermined pixel or may be compared by using statistical processing such as an average of the luminance values of the entire image is compared in each color. It is understood by those skilled in the art that a method for digitizing a color or brightness in the entire image for comparison is variously considered.

When the adjustment satisfies necessary conditions such as when the display apparatus 16 is newly connected to the information processing apparatus 10, the luminance space conversion section 66 notifies the user of that effect via the image output section 60 and the display apparatus 16. When the user performs an instruction input of the adjustment start in accordance with the notification, the luminance space conversion section 66 moves to an adjustment mode of the parameter. Alternatively, the adjustment mode may be able to be further started up at the time when the user feels the need. Regardless of the adjustment by the user or the adjustment by the luminance space conversion section 66, the parameter fixed after the adjustment is retained in the internal memory, and thereby the conversion of the luminance space is subsequently performed by using the parameter.

The luminance space conversion section 66 provides a signal of the additional image in which the luminance space is converted by using the adjusted parameter and the data of the $\propto$ image for the synthesis processing section 72. Even in the case where data is acquired from the luminance space conversion section 66, the synthesis processing section 72 substitutes the data and the data of the main image acquired from the main image data acquisition section 64 in the above-described formula 1 or formula 2 and calculates the pixel value of the display image. In this case, both the main image and the additional image are changed to the luminance signal defined in the HDR space, and therefore even the calculated pixel value is changed to the luminance signal in the HDR space. Here, the synthesis processing section 72 has the same function as that of the synthesis processing section 72 illustrated in FIG. 3.

The synthesis processing section 72 outputs the calculated result to the image output section 60. The image output section 60 is implemented by the GPU 24, the main memory 26, the output section 36, and the like. Further, the image output section 60 sequentially outputs the data of the main image provided from the image generation section 54 or data of an image on which the additional image provided from the image synthesis section 58 is superimposed to the display apparatus 16 at appropriate timing. Further, in the adjustment mode of the parameter used for the conversion of the luminance space, the image output section 60 acquires data of an adjustment screen from the luminance space conversion section 66 and outputs the data to the display apparatus 16. In the case where the luminance space conversion section 66 adjusts the parameter, the image output section 60 further acquires information according to an actual luminance value at the time when the adjustment image is displayed in each luminance space from the display apparatus 16 and provides the information for the luminance space conversion section 66.

As described above with reference to FIG. 3, in the display apparatus 16, the luminance value acquisition section 208 acquires luminance of the pixel by using the appropriate EOTF in accordance with whether the luminance signal of the transmitted image is the HDR luminance signal or the SDR luminance signal. Further, the luminance signal is output in each line from the display panel of the display section 210 and thereby the image is displayed in the HDR or SDR luminance range.

Figure 7:
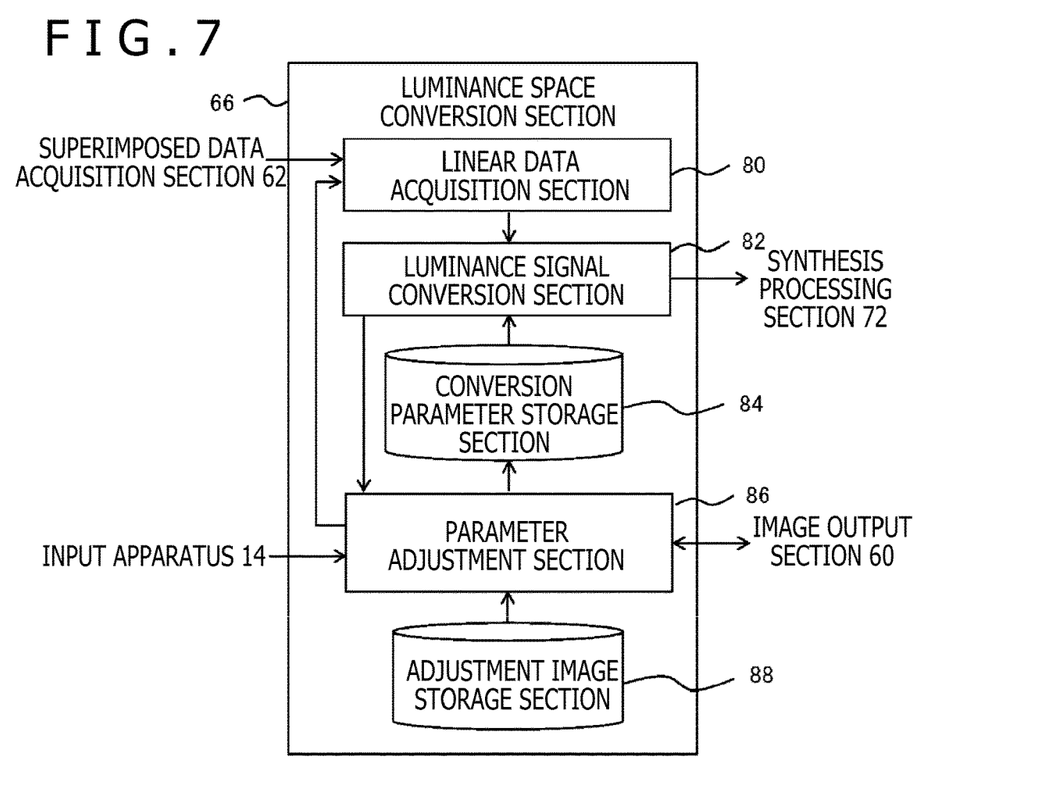
FIG. 7 is a diagram illustrating a configuration of functional blocks of a luminance space conversion section according to the present embodiment.

FIG. 7 illustrates a configuration of functional blocks of the luminance space conversion section 66 more particularly. The luminance space conversion section 66 includes a linear data acquisition section 80, a luminance signal conversion section 82, a conversion parameter storage section 84, a parameter adjustment section 86, and an adjustment image storage section 88. The linear data acquisition section 80 acquires data of the luminance signal of the image in which the conversion of the luminance space is needed and the data of the a image from the superimposed data acquisition section 62. Among the above, the luminance signal is generally subjected to a nonlinear conversion such as a gamma correction, and therefore a signal having a linear change with respect to original luminance is acquired by applying an inverse conversion.

The luminance signal conversion section 82 converts the luminance signal obtained as described above into the luminance signal in the HDR space. That is, as illustrated with reference to FIG. 4, the conversion is performed in accordance with a rule set in a direction in which an original signal is compressed. In the conversion, the luminance signal conversion section 82 refers to a parameter stored in the conversion parameter storage section 84. The conversion rule is determined so that a finally obtained luminance signal has, for example, a value based on ITU-R. BT. 2020 that is a specification of a color gamut and based on SMPTE ST2084 that is a specification of the transfer function. Through the process, an image having no uncomfortable feeling can be displayed even if the alpha blend processing is performed along with the main image originally represented in accordance with such a specification.

In the adjustment mode of the parameter used for the conversion of the luminance space, the parameter adjustment section 86 accepts the adjustment operation of the parameter from the user. Alternatively, the parameter adjustment section 86 itself makes adjustment processing of the parameter. Both a first case and a second case may be alternatively implemented or both the first case and the second case may be performed so as to be selected by the user. In the first case, as described above, the parameter adjustment section 86 aims at comparing the display image in the case where data of the adjustment image stored in the adjustment image storage section 88 is directly displayed as the SDR luminance signal and in the case where the above image data is converted into the HDR luminance space to be displayed.

In order to display the image converted into the HDR luminance space, the parameter adjustment section 86 allows the linear data acquisition section 80 and the luminance signal conversion section 82 to perform the same processing as the above-described processing on adjustment image data. Since synthesis processing does not need to be performed in the adjustment mode, the parameter adjustment section 86 directly inputs a signal of the image represented in each luminance space into the image output section 60 and allows the image output section 60 to output the signal to the display apparatus 16. Here, the data to be output corresponds to that of L3 and L7 illustrated in FIG. 3.

In accordance with the above, the display apparatus 16 converts the luminance signal represented in the SDR space or the HDR space into the luminance value by using the EOTF corresponding to respective luminance spaces to be displayed. In accordance with the adjustment operation from the user, the parameter adjustment section 86 changes the parameter used for the conversion in the luminance space as needed and reflects the parameter on the display. Then, the parameter adjustment section 86 stores the parameter at the time when the user performs a determination operation in the conversion parameter storage section 84 and allows itself to refer to the parameter in the subsequent conversion processing.

Even in the case where the parameter adjustment section 86 performs the adjustment processing, processing of allowing the display apparatus 16 to display the adjustment image represented in each luminance space is similar to the above adjustment processing. In this case, an actual luminance value when displaying each image as described above is acquired from the display apparatus 16 and a parameter when the difference is minimized is stored in the conversion parameter storage section 84.

The parameter as an adjustment target by the parameter adjustment section 86 exerts an influence on the conversion rule of the luminance space. When a color or brightness after the conversion can be adjusted, the target is not limited. For example, as illustrated in FIG. 4, a rate in the HDR luminance space with which the upper limit in the SDR luminance space is associated may be set to the rate R. An environment in which the SDR image is processed differs, in the transfer function or the color space, from that in which the HDR image is processed. Further, as described above, an actually displayed image emits a unique color depending on the display apparatus manufacturer or the like. Therefore, it is difficult to logically derive an appropriate rate R so that an impression is not changed before and after the conversion of the luminance space.

By contrast, when the rate R is adjusted in accordance with actual conditions, a variable range of the luminance value can be controlled. Therefore, even if the conversion rule of the intermediate value of the luminance signal is not particularly adjusted, an impression of a color or brightness that is exerted by the entire image as the conversion target is efficiently changed. Specifically, by changing the rate R, even if the conversion rule is a nonlinear function, the entire function can be changed. Note, however, that an adjustment parameter is not limited to the rate R as the gist; further, it may be one or a plurality of parameters that are included in the conversion function or exert an influence. A lookup table for conversion may be prepared in plurality and the table to be used may be changed in accordance with the adjustment.

Figure 8:
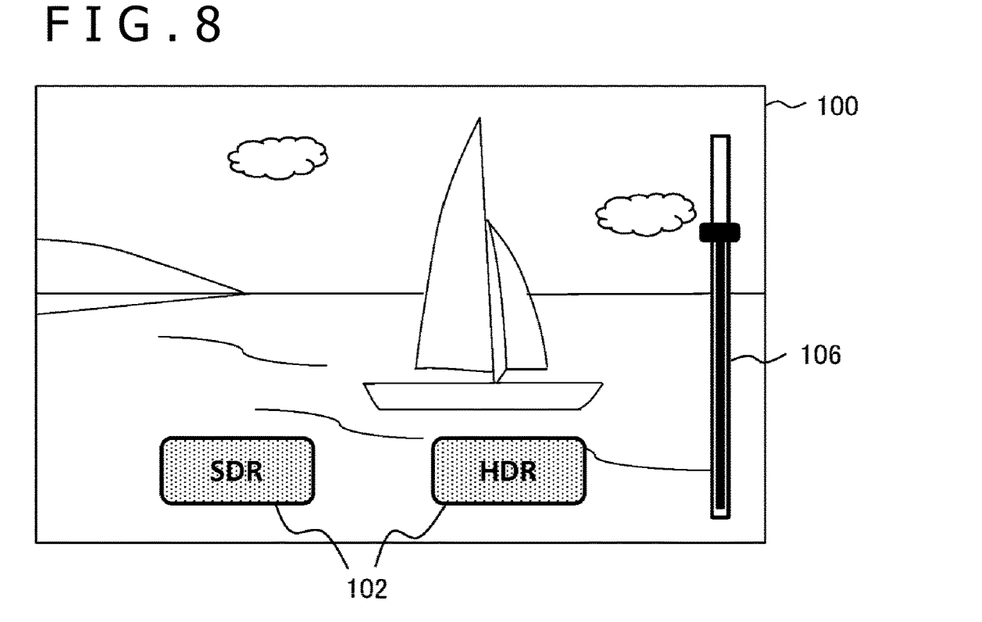
FIG. 8 is a diagram illustrating an adjustment screen to be proposed to a user in an adjustment mode of a parameter used for a conversion of the luminance space by a parameter adjustment reception section according to the present embodiment.

FIG. 8 illustrates the adjustment screen to be proposed to the user in the adjustment mode of the parameter used for the conversion of the luminance space by the parameter adjustment section 86. In the example, an adjustment screen 100 is allowed to display the adjustment image in the entire area and then to display a luminance space switching button 102 and an adjustment slide bar 106 as a graphical user interface (GUI). As described above, the adjustment image is a predetermined photographed image, a drawing image through computer graphics, or the like, which is defined in the SDR luminance space. The adjustment image may be a simpler color or graphic pattern, or the like.

When a button in which the "SDR" is described is operated in the luminance space switching buttons 102, the parameter adjustment section 86 directly outputs the adjustment image as data in the SDR luminance space. The above corresponds to an output of L3 illustrated in FIG. 3. In this case, the display apparatus 16 processes and displays the acquired data as the SDR data. On the other hand, the button in which the "HDR" is described is operated in the luminance space switching buttons 102. Then, the parameter adjustment section 86 converts the adjustment image into data in the HDR luminance space to be output.

The above corresponds to the fact that the output of L7 illustrated in FIG. 3 is directly input to the display apparatus 16. In this case, the display apparatus 16 processes and displays the acquired data as HDR data. The adjustment slide bar 106 can be operated only when the image in the HDR luminance space is displayed. The user compares an image displayed when operating the button of the "HDR" with an image displayed when operating the button of the "SDR." Further, when both of the images differ in the impression of a color or brightness, the user vertically moves a handle of the adjustment slide bar 106.

The parameter adjustment section 86 reconverts the luminance space while changing a parameter to be adjusted such as the rate R in accordance with the adjustment operation and allows the display apparatus 16 to instantly display the image. The user repeats the adjustment operation while viewing a changing image. Then, when a difference between both the images is not felt, the user performs the determination operation by using an operation method (not illustrated). The parameter adjustment section 86 stores a parameter at that time in the conversion parameter storage section 84. The luminance signal conversion section 82 uses the parameter stored as described above in the subsequent conversion processing.

Note that the adjustment screen illustrated in FIG. 8 is strictly illustrative. When switching of the luminance space and adjustment of the parameter can be performed viscerally and easily, specific methods are not limited. For example, those methods may be allocated to a hardware key of the input apparatus 14. Further, depending on the parameter to be adjusted, the adjustment may be performed by using the GUI or operation method for switching a target to be selected from a plurality of candidates and not by using a slide bar that brings about a continuous change.

Figure 9:
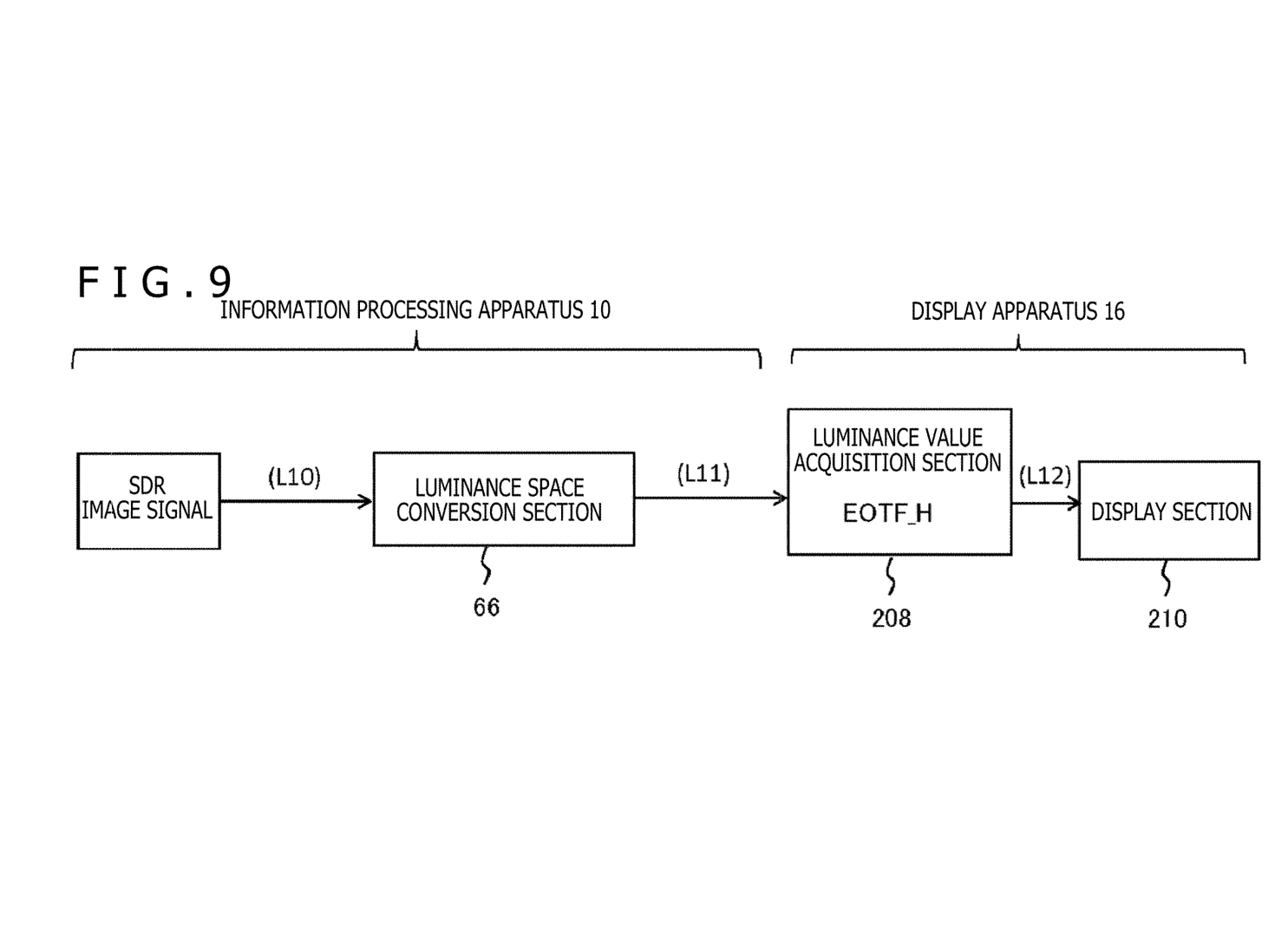
FIG. 9 is a diagram illustrating an outline of an image signal output from the information processing apparatus and signal processing of the display apparatus in the case where the luminance space is converted and an image represented in an SDR is displayed alone according to the present embodiment.

In the descriptions above, mainly when the main image is represented in the HDR, it is assumed that the additional image provided by the information processing apparatus 10 or the like is converted from the original SDR luminance space to the HDR luminance space to be superimposed and displayed by the alpha blend processing. On the other hand, when the conversion is performed by using the parameter adjusted as described above, even when the SDR image is displayed alone, it can be handled similarly to the HDR image on the side of the display apparatus. FIG. 9 illustrates an outline of a signal of the image output from the information processing apparatus 10 and the signal processing of the display apparatus 16 in such a case.

In this case, the image generation section 54 of the information processing apparatus 10 generates or decodes the SDR image internally and then directly inputs a luminance signal of the image to the luminance space conversion section 66 (L10). The luminance space conversion section 66 converts the acquired luminance signal into a luminance signal in the HDR space and outputs the luminance signal to the display apparatus 16 (L11). A function of the luminance space conversion section 66 is similar to that illustrated with reference to FIG. 7. Accordingly, a parameter after the adjustment is used for the conversion, which is stored in the conversion parameter storage section 84.

The luminance value acquisition section 208 of the display apparatus 16 converts the acquired luminance signal into the luminance value by using the EOTF corresponding to the HDR and sequentially outputs the luminance value to the display section 210 (L12). Through the process, data in which an original image is represented in the SDR can be processed similarly to the HDR image in the display apparatus 16. As a result, the displayed image inherits an original color or brightness.

By carrying out such a mode, an individual content such as a game represented in the SDR can be displayed similarly without the need for switching of the processing in the display apparatus or the like and without being affected by a difference between the display processing on the display apparatus corresponding to the HDR. Further, a parameter for an appropriate conversion is retained and shared on the side of the information processing apparatus. Thereby, troubles can be saved, such as a parameter is set within individual content in accordance with an assumed display apparatus.

In the case where the luminance space of an original image is converted into a different luminance space to be displayed, the present embodiment described above aims at adjusting the parameter used for the conversion in accordance with an actual display state. Specifically, a user interface is provided such that the display image processed directly in the original luminance space and an image that is displayed through the conversion processing of the luminance space are actually compared and the parameter can be adjusted by using an easy operation. Alternatively, an actual luminance of the displayed image is acquired from the display apparatus and the parameter is adjusted on the side of the information processing apparatus. Through the process, regardless of a difference between the processing within the display apparatus, an influence on the display result due to the presence or absence of the conversion of the luminance space is suppressed to the minimum and the display in a preferable state can be steadily performed.

In the result, regardless of whether the main image is the SDR image or the HDR image, the additional image represented in the SDR can be superimposed and displayed while bringing about the transparency with the similar physical appearance. Further, a generation mechanism of the additional image does not need to be formed in plurality, the additional image does not need to be generated in a plurality of kinds, or the like. Further, the additional image can be stably displayed in a state in which the world-view of the main image represented in a high freedom degree is not impaired. In addition, a parameter that is optimized by a single adjustment can be used in common regardless of content. Therefore, even if the parameter is not set within the content, the optimized parameter is allowed to easily correspond to the display apparatus in which various luminance spaces are assumed.

Thus, the present invention is described on the basis of the embodiment. It should be understood by those skilled in the art that the above embodiment is illustrative, that the combination of components and processes can be modified in various ways, and that such modification examples also fall within the scope of the present invention.

REFERENCE SIGNS LIST

8 Network, 10 Information processing apparatus, 14 Input apparatus, 16 Display apparatus, 23 CPU, 24 GPU, 26 Main memory, 50 Input information acquisition section, 52 Information processing section, 54 Image generation section, 56 Superimposed data generation section, 58 Image synthesis section, 60 Image output section, 62 Superimposed data acquisition section, 64 Main image data acquisition section, 66 Luminance space conversion section, 72 Synthesis processing section, 80 Linear data acquisition section, 82 Luminance signal conversion section, 84 Conversion parameter storage section, 86 Parameter adjustment section, 88 Adjustment image storage section.

INDUSTRIAL APPLICABILITY

As described above, the present invention is applicable to various information processing apparatuses such as a game machine, an image processing apparatus, a mobile terminal, and an electronic content processing apparatus, and an information processing system including them.

The invention claimed is:

1. An information processing apparatus comprising:
   an image data acquisition section configured to acquire an image signal represented in a first luminance space;
   a luminance space conversion section configured to convert the image signal into a signal represented in a second luminance space; and
   an image output section configured to output the image signal represented in either luminance space to a display apparatus, wherein
   the luminance space conversion section includes a parameter adjustment section that adjusts a parameter used for a signal conversion on a basis of predetermined information according to a display state in the display apparatus and converts a signal by using the parameter after the adjustment.

2. The information processing apparatus according to claim 1, wherein
   the parameter adjustment section switches and outputs a signal in which an adjustment image is represented in the first luminance space and a signal in which the image is represented in the second luminance space in accordance with a switching operation of a user to thereby allow the display apparatus to display the images so as to be compared, and then accepts an operation according to the adjustment from the user to thereby adjust the parameter.

3. The information processing apparatus according to claim 1, wherein
   the parameter adjustment section outputs a signal in which an adjustment image is represented in the first luminance space and a signal in which the image is represented in the second luminance space to thereby allow the display apparatus to display the images and adjusts the parameter on a basis of a result of acquiring and comparing a luminance value at a display time.

4. The information processing apparatus according to claim 1, wherein
   a luminance range represented by the first luminance space is smaller than a luminance range represented by the second luminance space, and
   the parameter adjustment section accepts an adjustment operation by using a rate in the second luminance space as the parameter, with which an upper limit of the first luminance space is associated.

5. The information processing apparatus according to claim 1, wherein
   the image data acquisition section further acquires a signal of an other image in which the image represented in the first luminance space is superimposed and displayed by alpha blend processing, and
   the luminance space conversion section converts the image signal represented in the first luminance space when the other image signal is represented in the second luminance space.

6. The information processing apparatus according to claim 1, wherein
   the parameter adjustment section notifies the user of a need for the adjustment operation of the parameter when a display apparatus is newly connected to the information processing apparatus.

7. An image processing method by an information processing apparatus, comprising:
   adjusting a parameter used to convert an image signal represented in a first luminance space into a signal represented in a second luminance space on a basis of predetermined information according to a display state in a display apparatus;
   acquiring the signal of an image to be displayed, represented in the first luminance space;
   converting the acquired signal of the image to be displayed into the signal represented in the second luminance space by using the parameter after the adjustment; and
   outputting the converted signal of the image to be displayed to the display apparatus.

8. A non-transitory computer readable medium having stored thereon a computer program for a computer, the computer program comprising:
   by a parameter adjustment section, adjusting a parameter used to convert an image signal represented in a first luminance space into a signal represented in a second luminance space on a basis of predetermined information according to a display state in a display apparatus;
   by an image data acquisition section, acquiring the signal of an image to be displayed, represented in the first luminance space;
   by a luminance space conversion section, converting the acquired signal of the image to be displayed into the signal represented in the second luminance space by using the parameter after the adjustment; and
   by an image output section, outputting the converted signal of the image to be displayed to the display apparatus.

* * * * *